(12) United States Patent
Holmes et al.

(10) Patent No.: US 8,992,378 B2
(45) Date of Patent: Mar. 31, 2015

(54) VEHICLE POWERTRAIN WITH CLUTCH ACTUATOR PROVIDING ELECTRICAL POWER

(71) Applicant: GM Global Technology Operations LLC, Detroit, MI (US)

(72) Inventors: Alan G. Holmes, Clarkston, MI (US); Anthony L. Smith, Troy, MI (US); Anthony J. Corsetti, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 13/954,500

(22) Filed: Jul. 30, 2013

(65) Prior Publication Data

US 2015/0038288 A1 Feb. 5, 2015

(51) Int. Cl.
| | |
|---|---|
| *B60W 10/02* | (2006.01) |
| *B60W 10/06* | (2006.01) |
| *B60W 10/08* | (2006.01) |
| *B60W 10/10* | (2012.01) |
| *F16D 27/14* | (2006.01) |
| *F16D 23/00* | (2006.01) |
| *B60K 6/26* | (2007.10) |

(52) U.S. Cl.
CPC ............... *B60K 6/26* (2013.01); *Y10S 903/906* (2013.01); *B60K 2006/268* (2013.01)

USPC ................. 477/5; 192/84.6; 192/94; 903/906

(58) Field of Classification Search
USPC ............... 477/5; 192/84.6, 84.7, 94; 903/912, 903/914, 946
See application file for complete search history.

(56) References Cited

U.S. PATENT DOCUMENTS

| | | | |
|---|---|---|---|
| 7,728,477 B2 * | 6/2010 | Birdi et al. ...................... 310/94 |
| 2002/0025880 A1 * | 2/2002 | Kusumoto et al. ................ 477/5 |
| 2003/0094343 A1 * | 5/2003 | Showalter ....................... 192/35 |
| 2004/0195070 A1 * | 10/2004 | Kao et al. .................. 192/109 F |
| 2012/0028757 A1 * | 2/2012 | Kimura et al. .................... 477/5 |

* cited by examiner

*Primary Examiner* — Edwin A Young
(74) *Attorney, Agent, or Firm* — Quinn Law Group, PLLC

(57) ABSTRACT

A vehicle powertrain includes a first rotatable member and a second rotatable member. A clutch has an engaged state in which torque is transferred between the first rotatable member and the second rotatable member through the clutch. The clutch has a disengaged state in which torque is not transferred between the first rotatable member and the second rotatable member through the clutch. A clutch actuator includes a motor-generator that has a rotor rotatably drivable by one of the first rotatable member and the second rotatable member, and has a stator powerable to rotatably drive the rotor relative to said one of the first rotatable member and the second rotatable member. A controller is operatively connected to the stator and is configured to control the motor-generator to function as a generator to provide torque on the rotor. The motor-generator provides electrical power to a vehicle component.

20 Claims, 3 Drawing Sheets

US 8,992,378 B2

VEHICLE POWERTRAIN WITH CLUTCH ACTUATOR PROVIDING ELECTRICAL POWER

TECHNICAL FIELD

The present teachings generally include a vehicle powertrain having a clutch with a clutch actuator that provides electrical power.

BACKGROUND

Automotive vehicles typically have electrically-powered accessories such as headlamps and a stereo system. Electrical power for the accessories is typically provided by a battery. The battery in turn is powered by an engine-driven alternator. In a hybrid vehicle, a hybrid motor-generator provides the electrical energy for the vehicle accessories. Because the hybrid motor-generator typically provides power at a different voltage than that required by the electrical accessories, a power converter, sometimes referred to as an auxiliary power module is needed to convert the power from the voltage level provided by the hybrid motor-generator to the voltage level required by the electrical accessories. Minimizing the complexity and number of components in a vehicle powertrain, especially those affecting mechanical or electrical power transfer, can improve the overall efficiency of the powertrain.

SUMMARY

A vehicle powertrain is provided that is configured to use electrical energy generated by one or more clutch actuators to provide electrical power to one or more vehicle components, such as vehicle electrical accessories. The vehicle powertrain includes a first rotatable member and a second rotatable member. A clutch has an engaged state in which torque is transferred between the first rotatable member and the second rotatable member through the clutch. The clutch has a disengaged state in which torque is not transferred between the first rotatable member and the second rotatable member through the clutch. A clutch actuator includes a motor-generator that has a rotor rotatably drivable by one of the first rotatable member and the second rotatable member, and has a stator powerable to rotatably drive the rotor relative to said one of the first rotatable member and the second rotatable member. A controller is operatively connected to the stator and is configured to control the motor-generator to function as a generator to provide torque on the rotor (i.e., drag torque) to change the state of the clutch from one of the engaged state and the disengaged state to the other of the engaged state and the disengaged state. At least one vehicle component is operatively connected to the stator. The motor-generator provides electrical power to the vehicle component when the motor-generator functions as a generator.

For example, by utilizing one or more clutch actuators that can provide electrical energy to power the vehicle electrical accessories, a state-of-charge of the vehicle battery is not depleted. This may be especially beneficial for a hybrid vehicle that utilizes electrical energy in the battery for vehicle propulsion. Moreover, in some embodiments, use of a converter or auxiliary power module may be avoided for the electrical power generated by the motor-generator of the clutch actuator which may improve overall vehicle efficiency. Use of the motor-generator of the clutch actuator in place of a separate hybrid motor-generator to provide electrical power may effectively have a negative power loss (i.e., a power savings) at a vehicle level. In some embodiments, the motor-generator of the clutch actuator may be the only generator included in the powertrain. In other embodiments, one or more clutch actuators can be used and the respective motor-generator of one or more of the clutch actuators can be a hybrid motor-generator configured to provide vehicle propulsion. The motor-generator of the clutch actuator may also be used to start the engine in some embodiments.

The above features and advantages and other features and advantages of the present teachings are readily apparent from the following detailed description of the best modes for carrying out the present teachings when taken in connection with the accompanying drawings.

DETAILED DESCRIPTION

Figure 1:
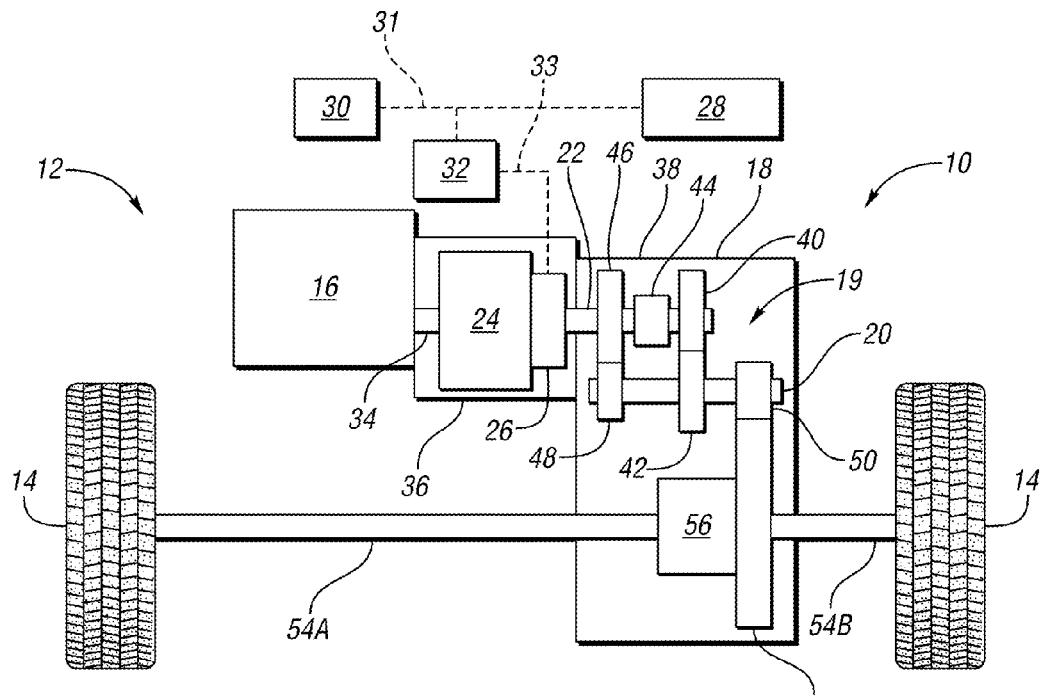
FIG. 1 is a schematic illustration of a vehicle with a powertrain having a clutch with a clutch actuator in a first aspect of the present teachings.
Figure 6:
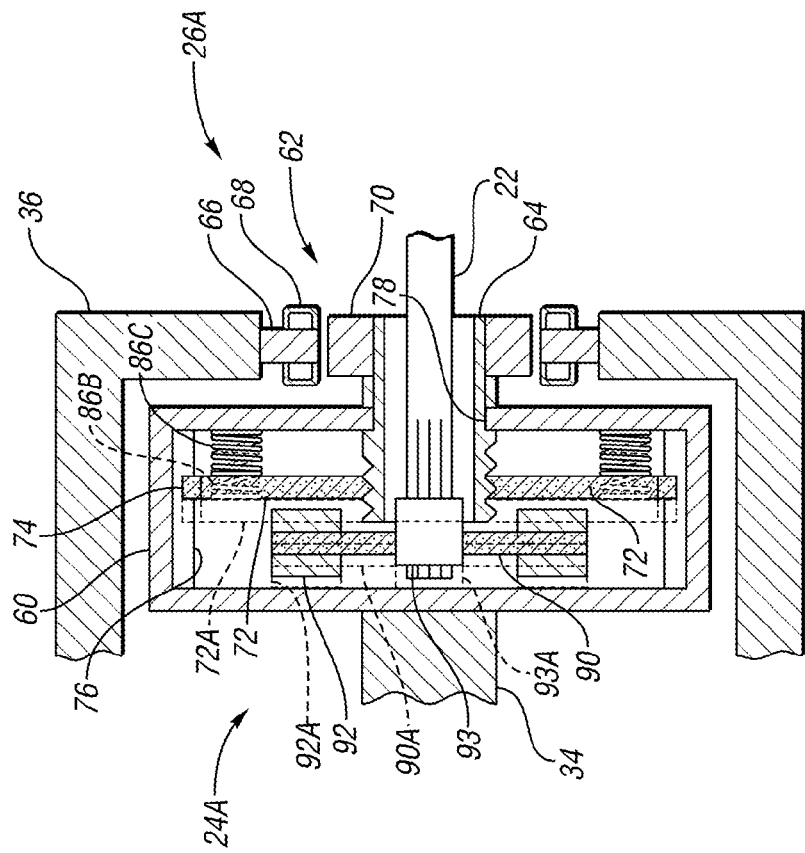
FIG. 6 is a schematic illustration in partial fragmentary and cross-sectional view of another embodiment of a clutch and clutch actuator of FIGS. 1-4 with the clutch in a disengaged state and represented in phantom in an engaged state.

Referring to the drawings, wherein like reference numbers refer to like components throughout the several views, FIG. 1 shows a vehicle 10 with a powertrain 12 that can provide tractive torque to vehicle wheels 14 for propelling the vehicle 10. The powertrain 12 includes a prime mover, such as an engine 16 that creates driving torque by combusting fuel. The powertrain 12 further includes a transmission 18 that can provide torque from the engine 16 to the vehicle wheels 14 through a gearing arrangement 19 at various ratios of torque of a transmission output member 20 to torque of a transmission input member 22. The different ratios are established by selective engagement of different torque transfer devices, such as clutches, brakes, or synchronizers. As discussed herein, at least one of the torque transfer devices is a rotating clutch which, when engaged, transfers torque that is carried along a torque transfer path from the transmission input member 22 to the transmission output member 20. The powertrain 12 of FIG. 1 includes one such rotating clutch, first clutch 24, one embodiment of which is shown in greater detail in FIG. 5, and an alternate embodiment of which is shown in FIG. 6. A first clutch actuator 26 actuates the clutch 24 to change its state from a disengaged state to an engaged state or, in some embodiments, from an engaged state to a disengaged state.

As discussed herein, the clutch actuator 26 generates electrical power when actuating the clutch 24, and the electrical power is used to power one or more vehicle electrical accessories 28. A controller 32 is operatively connected to the clutch actuator 26, to the battery 30, and to the electrical accessories 28 and is configured to execute an algorithm that directs electrical power as described. If the controller 32, battery 30 and accessories 28 share a common voltage, then they can be connected in a "T" arrangement, in parallel, as shown, by a direct current (DC) power bus 31. The motor-generator 62 is connected to the controller 32 with separate low voltage alternating current (AC) power wires 33 (that is, with three-phase A, B, C wires). If the clutch actuator 26 produces more electrical energy than is required to meet a power demand of the electrical accessories 28, the controller 32 directs the excess power to a battery 30 if the state-of-charge of the battery 30 is less than a predetermined maximum state-of-charge. Alternatively, the motor-generator 62 can be controlled so that the amount of electrical power provided can vary between a minimum amount that is provided when transmitting a desired amount of mechanical power through the clutch 24 to a maximum amount corresponding with the electrical generating capacity of the motor-generator 62. The amount of electrical power provided can be varied between this minimum and maximum amount to more precisely meet the varying electrical power demand of the vehicle electrical accessories 28. If the clutch actuator 26 is not actuating the clutch 24 and so is not generating electrical power, then the controller 32 directs the electrical power from the battery 30 to the electrical accessories 28. Additionally, if the clutch actuator 26 is not generating enough electrical energy to meet a power demand of the vehicle electrical accessories 28, then the electrical power provided by the clutch actuator 26 is supplemented by electrical power from the battery 30 to meet the power demand of the vehicle operating accessories 28.

With further reference to FIG. 1, the engine 16 has a crankshaft 34 that is operatively connected for rotation with the transmission input member 22 when the clutch 24 is engaged. A stationary bell housing 36 surrounds the clutch 24 and the clutch actuator 26. The bell housing 36 can mount to or be made integral with a transmission housing 38 that surrounds the gearing arrangement 19. The gearing arrangement 19 includes a first set of meshing gears 40, 42 that can transfer torque from the input member 22 to the output member 20 at a first gear ratio when a synchronizer 44 is shifted to the right to engage gear 40 with the input member 22, and a second set of intermeshing gears 46, 48 that can transfer torque from the input member 22 to the output member 20 when the synchronizer 44 is shifted to the left to engage gear 46 with the input member 22, as is understood by those skilled in the art. Additional sets of intermeshing gears and synchronizers can be included. The synchronizer 44 can be shifted manually, which includes by hand or by foot (if the transmission 18 is a manual transmission) or can be automated under the control of the controller 32 or another controller (if the transmission 18 is an automated manual transmission). A final drive gear set includes intermeshing gears 50, 52 that transfer torque from the transmission output member 20 to half shafts 54A, 54B via a differential 56. The half shafts 54A, 54B are operatively connected to the wheels 14.

Figure 5:
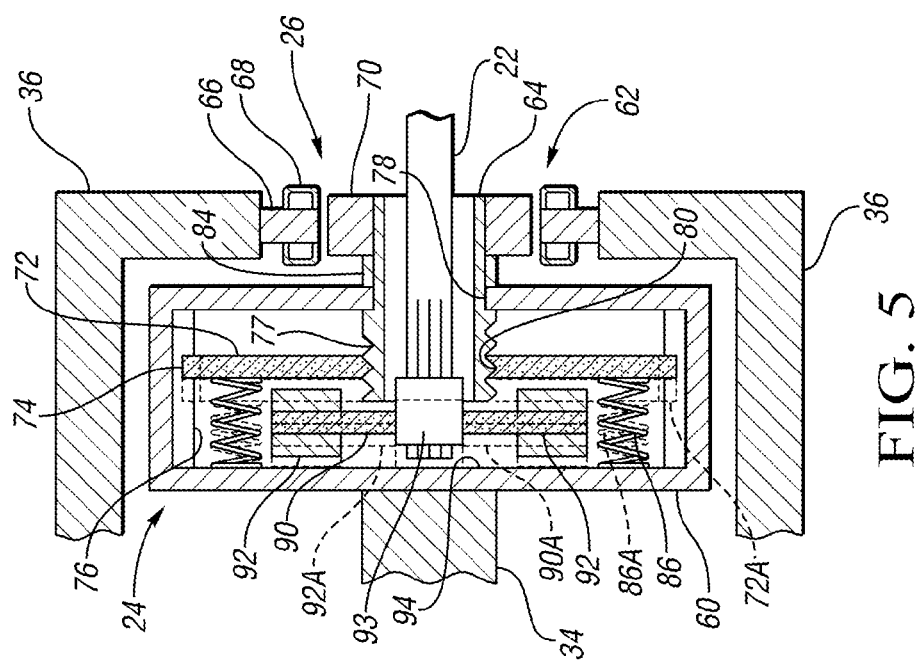
FIG. 5 is a schematic illustration in partial fragmentary and cross-sectional view of one embodiment of a clutch and clutch actuator of FIGS. 1-4 with the clutch in a disengaged state and represented in phantom in an engaged state.

Referring now to FIG. 5, one embodiment of the clutch 24 and clutch actuator 26 is shown in greater detail. The clutch 24 includes a rotatable clutch housing 60 that is fixed to rotate in unison with a rotatable member, shown as the engine crankshaft 34 in this embodiment. That is, the clutch housing 60 rotates at the same speed and together with the engine crankshaft 34. The engine crankshaft 34 is referred to as a first rotatable member and is the mechanical power input member for the clutch 24 in this embodiment. Alternatively, a damper can be positioned between the crankshaft 34 and the clutch housing 60. In such an embodiment a separate shaft would connect the damper to the clutch housing 60.

The clutch actuator 26 includes a motor-generator 62 and a hollow drive screw 64 that extends into the clutch housing 60. The motor-generator 62 has a stator 66 with electrical windings 68. The stator 66 is fixed to a stationary member such as the bell housing 36. The motor-generator 62 includes a rotor 70 that is mounted on and rotates in unison with the drive screw 64. The clutch 24 includes a pressure plate 72 with outer ends 74 splined to the splined inner wall 76 of the clutch housing 60. The drive screw 74 has a threaded portion 77. The pressure plate 72 has an inner opening 80 sized and shaped to mount to the drive screw 64 at the threaded portion.

The drive screw 64 can be rotated relative to the clutch housing 60 at a bearing surface 78. A sleeve 84 helps to axially fix the rotor 70 and the drive screw 64. The stator 66 can be controlled by the controller 32 of FIG. 1 to function as a motor or as a generator to rotatably drive the rotor 70 relative to the clutch housing 60, and thereby relative to the engine crankshaft 34. When the rotor 70 rotates relative to the clutch housing 60, the pressure plate 72 will move axially on the threaded portion 77 over a range of actuation of the clutch actuator 26, which may be a number of turns of the drive screw 64, until the pressure plate 72 meets an end of the threaded portion 77 at the right in FIG. 5, or an end of the threaded portion 77 at the left in FIG. 5.

The transmission input member 22, also referred to as a second rotatable member, extends through the hollow drive screw 64 into the clutch housing 60. In the embodiment shown, at least one biasing member biases the pressure plate 72 to a predetermined axial position relative to the clutch housing 60 when the motor-generator 62 is unpowered. In the embodiment of FIG. 5, the biasing members are springs 86. The springs 86 are shown biasing the pressure plate 72 to a disengaged position. In other embodiments, such as shown and discussed with respect to FIG. 6, the springs can be positioned to bias the pressure plate 72 to an engaged position. In still other embodiments, no biasing member is used.

A clutch plate 90 is splined to the transmission input member 22 within the clutch housing 60 and is configured to rotate with the transmission input member 22. The clutch plate 90 is fixed to a hub 93 that is splined to a splined end of the transmission input member 22. Alternately, a damper, not shown, can be positioned between the clutch plate 90 and the hub 93. The clutch plate 90 supports friction material 92 that is sufficient to engage the clutch housing 60 when the clutch 24 is in the engaged state so that the engine crankshaft 34 and the transmission input member 22 rotate together in unison.

In order to engage the clutch 24, the controller 32 controls the motor-generator 62 to function as a generator, creating a torque on the rotor 70 while converting mechanical power of the rotating rotor 70 into electrical power at a specific voltage, referred to herein as a second voltage, and causing current to flow in the windings 68. When the motor-generator 62 functions as a generator, induced current flow in the windings creates a "drag torque" or a "biasing torque" that acts on the rotor 70, that initially causes the rotor 70 and drive screw 64 to rotate relative to the clutch housing 60. For example, this rotation may be over an actuation range of one or two rotations of the drive screw 64. The relative rotation causes the pressure plate 72 to move axially toward the clutch plate 90, overcoming the bias of the springs 86. The pressure plate 72 contacts the friction material 92, causing the inner splined hub 93 of the clutch plate 90 to move axially along the splined transmission input member 22, and compressing the friction material 92 against the inner end wall 94 of the clutch housing 60 to engage the clutch 24. The pressure plate 72 is shown moved to an engaged position 72A in phantom. When the pressure plate 72 is in the engaged position 72A, the clutch plate 90 is moved to the left in FIG. 5 so that the friction material 92 is pressed against the inner wall 94. In the engaged position, the clutch plate 90 is shown in phantom at 90A, the friction material 92 is shown in phantom at 92A, the pressure plate is shown in phantom at 90A, and the springs 86 are shown in compressed positions 86A. With the clutch 24 in the engaged position, the clutch housing 60 rotates in unison with the clutch plate 90 so that the engine crankshaft 34 rotates in unison with the transmission input member 22. To disengage the clutch 24, the controller 32 turns off the motor-generator 62, such as by opening switches, and the springs 86 return to the uncompressed position in which they bias the pressure plate 72 to the disengaged position. The clutch 24 of FIG. 5 can be configured to remain on without the use of the motor-generator 62 (i.e., even when the motor-generator 62 is turned off following clutch engagement) if the friction between the threaded portion 77 and the pressure plate 72 at the inner opening 80, and between the drive screw 64 and the clutch housing 60 at the bearing surface 78 exceeds the return force caused by the springs 86. Conversely, the clutch 24 in FIG. 5 will release if the return force caused by the springs 86 exceeds this friction.

As the engine crankshaft 34 rotates with the clutch 24 in the engaged position and with the motor-generator 62 functioning as a generator, electrical power is continuously produced by converting a portion of the mechanical power input by the crankshaft 34 into electrical power due to the continuous drag torque of the rotor 70 on the drive screw 64. In the embodiment of FIG. 5, the motor-generator 62 is configured so that the electrical energy produced is at a second voltage that is either the same as the voltage required for powering the vehicle electrical accessories 28 or converted by the controller 32 into a voltage required for powering the vehicle accessories 28 (for example, converted from AC voltage to DC voltage).

FIG. 6 shows an alternative embodiment of a clutch 24A and actuator 26A for use with the powertrains of FIGS. 1-4. The clutch 24A and actuator 26A are alike in all aspects to clutch 24 and clutch actuator 26 of FIG. 5, except that springs 86B are positioned to bias the clutch 24A to an engaged position in which the springs 86B, the clutch plate 90A, the friction material 92A, and the hub 93A are shown in phantom, and the motor-generator 26 is powered to function as a generator to move the clutch 26A to the disengaged position shown (with springs shown as 86C). That is, the generator 62 causes the rotor 70 and drive screw 64 to rotate relative to the clutch housing 60 sufficiently to move the pressure plate 72 and the clutch plate 90 axially to the right to the disengaged position shown with threaded portion 77 and inner opening 80 including the appropriate spiral direction of threads. The motor-generator 62 is continuously controlled as a generator to maintain the clutch plate 90 in the disengaged position, thereby continuously generating electrical power at the second voltage that can be used to power the vehicle accessories 28 as described above.

In different embodiments, the motor-generator 62 can be configured so that controlling the motor-generator 62 to function as a motor (rather than as a generator) either engages or disengages the clutch 24 or 24A by rotating the drive screw 64 relative to the clutch housing 60 in a forward direction of rotation (i.e., direction of rotation of the clutch housing 60 consistent with forward propulsion of the vehicle wheels 14). Alternatively, the motor-generator 62 can be configured so that controlling the motor-generator 62 to function as a generator either engages or disengages the clutch 24 or 24A by rotating the drive screw 64 relative to the clutch housing 60 in a forward direction.

When used in the powertrain 12 of FIG. 1, either one of the clutches 24 or 24A enables the motor-generator 62 to be used as a motor to start the engine 16 with the vehicle 10 in a neutral state (i.e., without engaging clutch 24). Because the rotor 70 is mounted on the drive screw 64 and the pressure plate 72 connects the clutch housing 60 to rotate with the drive screw 64, the motor-generator 62 can be operated as a motor to drive the clutch housing 60, thereby driving the crankshaft 34 to start the engine 16. That is, when the motor-generator 62 is operated by the controller 32 as a motor, to provide torque to the drive screw 64, the pressure plate 72 will move to a position where the clutch 24 is disengaged and then to a stop, such as the end of the threaded portion 77 of the drive screw 64, causing the drive screw 64 to stop rotating relative to the clutch housing 60 and allowing the torque from the rotor 70 to be transmitted to the engine crankshaft 34 in the forward direction of engine rotation. In the vehicle 10 of FIG. 1, the motor-generator 62 is the only generator in the powertrain 12, and there is no other starter required to start the engine 16.

Figure 2:
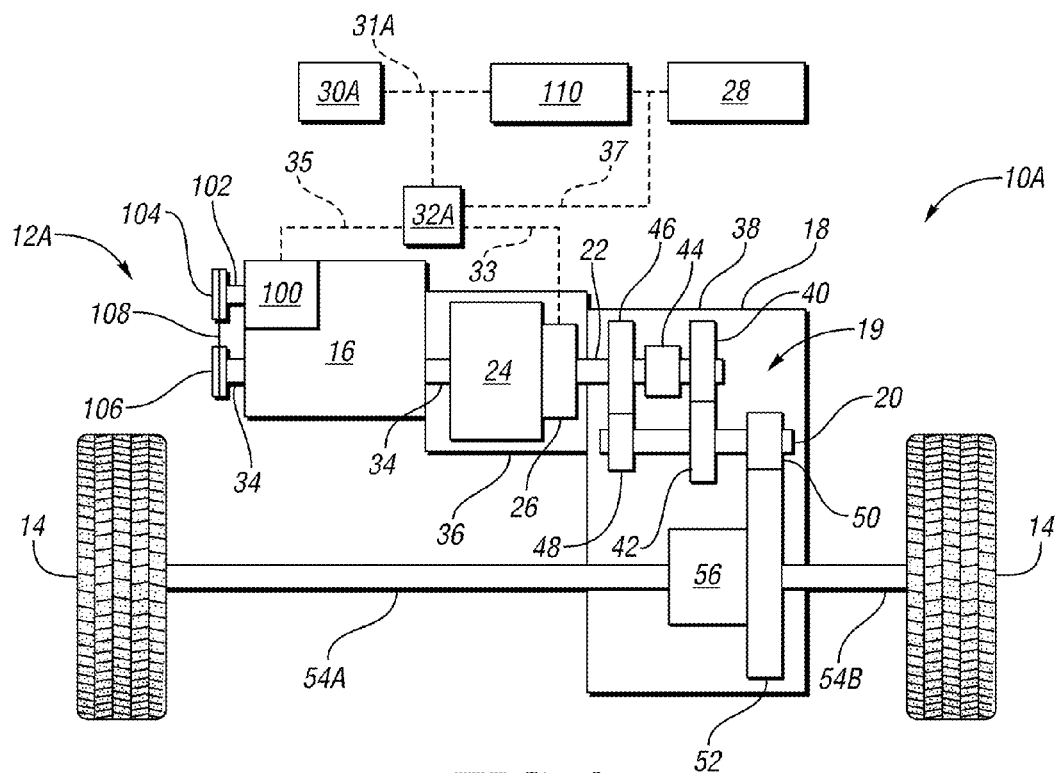
FIG. 2 is a schematic illustration of a vehicle with a powertrain having a clutch with a clutch actuator in a second aspect of the present teachings.

Referring to FIG. 2, a vehicle 10A with a powertrain 12A is shown. The vehicle 10A and powertrain 12A have many of the same components as vehicle 10 and powertrain 12 of FIG. 1. Like components are labeled with like reference numbers and function as described with respect to FIG. 1. The powertrain 12A is different from powertrain 12 in that it has a hybrid motor-generator 100 operable to function as a motor using electrical power from a battery 30A at a first voltage to provide torque to the powertrain 12A. Specifically, the motor-generator 100 is controlled by a controller 32A to function as a motor to provide torque on the crankshaft 34. The motor-generator 100 is connected to the controller 32A by a set of high voltage AC power wire 35 (e.g., three-phase X, Y, and Z wires). The controller 32A can convert the AC power provided through wires 33 from the motor-generator 62 to direct voltage at a level required by the accessories 28 via DC wires 37, and can convert the high power AC voltage provided along wires 35 from the motor-generator 100 to DC voltage at the high power level along wires 31A. The hybrid motor-generator 100 is operatively connected to the crankshaft 34 through a belt-alternator-starter arrangement. Stated differently, a driveshaft 102 of the motor-generator 100 is connected to drive the crankshaft 34 by a pulley 104 that rotates with the drive shaft 102, a pulley 106 that rotates with the crankshaft, and a belt 108 that engages the pulleys 104, 106 to drivingly connect the motor-generator 100 with the crankshaft 34. The motor-generator 100 requires electrical power at a first voltage (a higher voltage level than the voltage level required by the accessories) to be operated as a motor.

The motor-generator 100 is also controllable by the controller 32A to function as a generator to convert torque from the powertrain 12A to electrical power at the first voltage stored in the battery 30A. As discussed above, the vehicle electrical accessories 28 are powerable by electrical power at a second voltage that is different from the first voltage. Accordingly, the powertrain 12A has a converter 110 that is operatively connected to the battery 30A and to the vehicle electrical accessories 28. The converter 110 is also referred to as an auxiliary power module (APM). The converter 110 is configured to convert electrical power stored in the battery 30A from the first voltage to the second voltage. The converter 110 includes power electronics that enable the voltage to be converted, as is well understood by those skilled in the art.

With the converter 100, either source of electrical power (i.e., the hybrid motor-generator 100 or the clutch actuator 26) can be used to provide electrical power to the vehicle electrical accessories 28. Specifically, the controller 32A controls the converter 110 to be off when the motor-generator 62 of the clutch actuator 26 provides electrical power to the vehicle electrical accessories 28 sufficient to meet a power demand of the vehicle electrical accessories 28. Keeping the converter 110 off can have power savings because losses associated with the power electronics in a converter are avoided. In operating modes where the clutch actuator 26 enables the motor-generator 62 to function as a generator, the converter 110 can be off when the motor-generator 62 of the actuator 26 provides sufficient electrical power to meet the power demand of the vehicle electrical accessories 28, and to be on when the motor-generator 62 of the actuator 26 provides less electrical power than required by the power demand of the vehicle electrical accessories 28. Control of the motor-generator 62 in this manner allows the converter 110 to be on and functioning only when a relatively high power demand exists. Converters such as converter 110 are typically more efficient at high power demand levels. Although the hybrid motor-generator 100 is shown operatively connected with the crankshaft 34, one or more motor-generators 100 could be connected with any rotating component within the transmission 16 in different hybrid arrangements.

Figure 3:
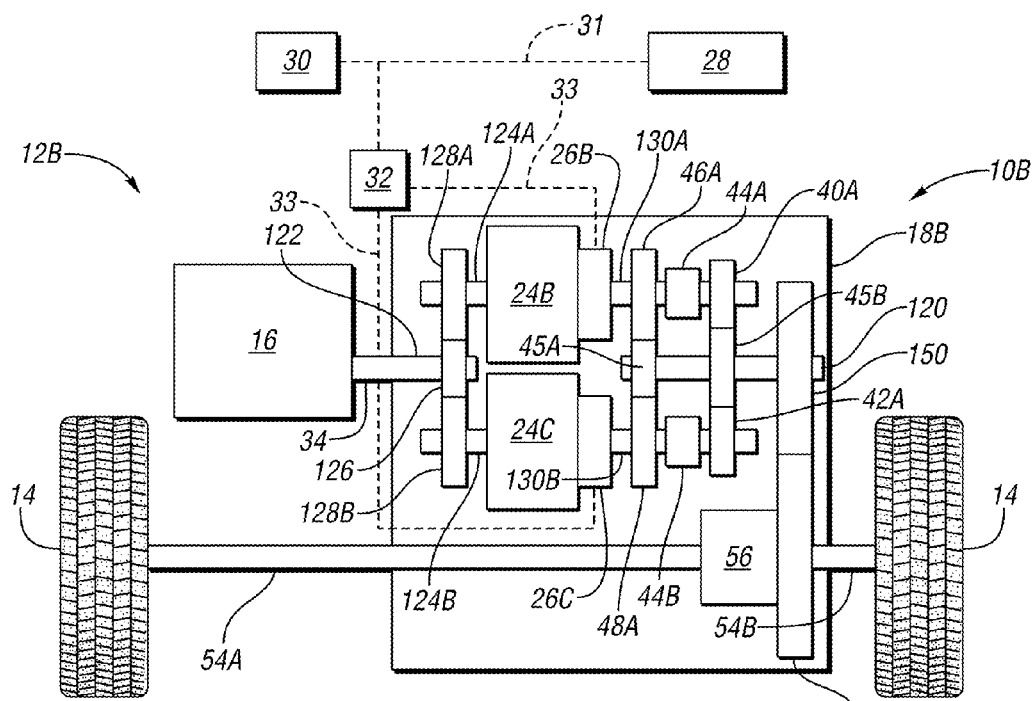
FIG. 3 is a schematic illustration of a vehicle with a powertrain having multiple clutches with multiple clutch actuators in a third aspect of the present teachings.

FIG. 3 shows another embodiment of a vehicle 10B with a powertrain 12B that has many of the same components as vehicle 10 and powertrain 12 of FIG. 1. Like components are labeled with like reference numbers and function as described with respect to FIG. 1. The powertrain 12B is different from powertrain 12 in that it has a dual-input clutch transmission 18B with input clutches 24B, 24C that have clutch actuators 26B, 26C, respectively. The clutch 24B is referred to as a first clutch with a first clutch actuator 26B, and the clutch 24C is referred to as a second clutch with a second clutch actuator 26C. The clutches 24B, 24C and clutch actuators 26B, 26C are configured like clutch 24 or clutch 24A, and like clutch 26 or 26A, respectively, of FIGS. 5 and 6. Accordingly, electrical power can be provided to the vehicle electrical accessories 28 whenever either one of the clutch actuators 26B, 26C is controlled to function as a generator. The motor-generator of the clutch actuator 26B is a first motor-generator like motor-generator 62, has a stator like stator 66, and has a first rotor like rotor 70 that is rotatably driven by a first transfer shaft 124A. The motor-generator of the clutch actuator 26B can be controlled as a generator to cause the first rotor to rotate relative to the first transfer shaft 124A to engage or disengage the clutch 24A. The motor-generator of the clutch actuator 26C is a second motor-generator like motor-generator 62, has a stator like stator 66 and has a second rotor like rotor 70 that is rotatably driven by a second transfer shaft 124B. The motor-generator of the clutch actuator 26B can be configured as a generator to cause the second rotor to rotate relative to the second transfer shaft 124B to engage or disengage the clutch 24C.

The crankshaft 34 rotates with a transmission input shaft 122 that drives a center gear 126 of a gear set that includes a gear 128A meshing with gear 126 and rotating with first transfer shaft 124A, and a gear 128B meshing with gear 126 and rotating with the second transfer shaft 124B.

The first transfer shaft 124A rotatably drives the rotor of the clutch actuator 26B, and the rotor can rotate relative to the transfer shaft 124A when controlled to drive the drive screw of the actuator 26B. When the first clutch 24B is in an engaged state, the first transfer shaft 124A is connected to rotate in unison with a first layshaft 130A. When the first clutch 24B is in a disengaged state, the first transfer shaft 124A is not connected to rotate with the first layshaft 130A. The first transfer shaft 126A is referred to as the first rotatable member. The first layshaft 130A is referred to as a second rotatable member and extends into the clutch 24B with a clutch plate 90 mounted thereon, similar to input shaft 22 of FIGS. 5 and 6.

The second transfer shaft 124B rotatably drives the rotor of the clutch actuator 26C, and the rotor can rotate relative to the transfer shaft 124B when controlled to drive the drive screw of the actuator 26C. When the clutch 24C is in an engaged state, the second transfer shaft 124B is connected to rotate in unison with second layshaft 130B. When the second clutch 24C is in a disengaged state, the second transfer shaft 124B is not connected to rotate with the second layshaft 130B. The second transfer shaft 124B is referred to as the third rotatable member. The second layshaft 130B is referred to as a fourth rotatable member and extends into the clutch 24C with a clutch plate 90 mounted thereon, similar to input shaft 22 of FIGS. 5 and 6.

Each of the layshafts 130A, 130B has two gears rotatably mounted thereon that can be engaged to rotate with the respective layshaft by a torque transfer device such as a synchronizer. Synchronizer 44A is shiftable to the left to engage gear 46A with the first layshaft 130A, or to the right to engage gear 40A with the first layshaft 130A. Synchronizer 44B is shiftable to the left to engage gear 48A with the second layshaft 130B, or to the right to engage gear 42A with the second layshaft 130B.

Gears 45A and 45B are mounted to rotate with the output shaft 120. Gear 45A meshes with gears 46A and 48A. Gear 45B meshes with gears 40A and 42A. Due to the different diameters of the various gears, different torque ratios of the output shaft 120 to the input shaft 122 are established depending on which one of the clutches 24B, 24C is engaged, and the positions of the synchronizers 44A, 44B as will be well understood by those skilled in the art. A final drive gear set 150, 152 and a differential 56 then provide tractive torque to the vehicle wheels 14 through half shafts 54A, 54B.

In a dual-input clutch transmission, the input clutches 24B, 24C are alternately engaged to proceed through the various gear ratios. Accordingly, one of the input clutches 24B or 24C is always engaged when the transmission 18B is in a forward gear or in a reverse gear and the other is always disengaged. One of the input clutches 24B, 24C can always be operated as a generator to provide electrical power (whether configured to operate as a generator when engaged or when disengaged) in different operating modes of the powertrain 12B. In such an embodiment, each of the clutches 24B, 24C would need to be configured to engage when their respective actuator 26B or 26C generates electricity, or each would need to be configured to disengage when their respective actuator 26B or 26C is generating electricity.

The vehicle electrical accessories 28 are operatively connected to both of the clutch actuators 26B, 26C through a controller 32. The controller 32 directs the electrical power generated by whichever one of the clutch actuators 26B, 26C is operated as a generator to the electrical accessories 28, unless the power generated exceeds a power demand of the electrical accessories 28, in which case the power can be directed to the battery 30 if a state-of-charge of the battery 30 is less than a predetermined state of charge, or to the motor-generator of the other of the clutch actuators 26C, 26B. If additional electrical power is required than can be provided by one of the clutch actuators 26B, 26C operating as a generator, then the controller 32 can direct stored electrical energy from the battery 30 to the vehicle electrical accessories 28. If neither of the synchronizers 44A, 44B is engaged, then one or both clutches 24B, 24C can be engaged in a neutral state of the transmission 16B so that the vehicle electrical accessories 28 can be powered by one or both clutch actuators 26B, 26C. Moreover, one of the motor-generators of the clutch actuators 26B, 26C could be controlled as a motor to start the engine 16 with the other of the clutch actuators 26C, 26B engaged, or to provide additional torque to the transmission layshafts 130A, 130B. No additional starter and no additional generator are required in the powertrain 12B.

Figure 4:
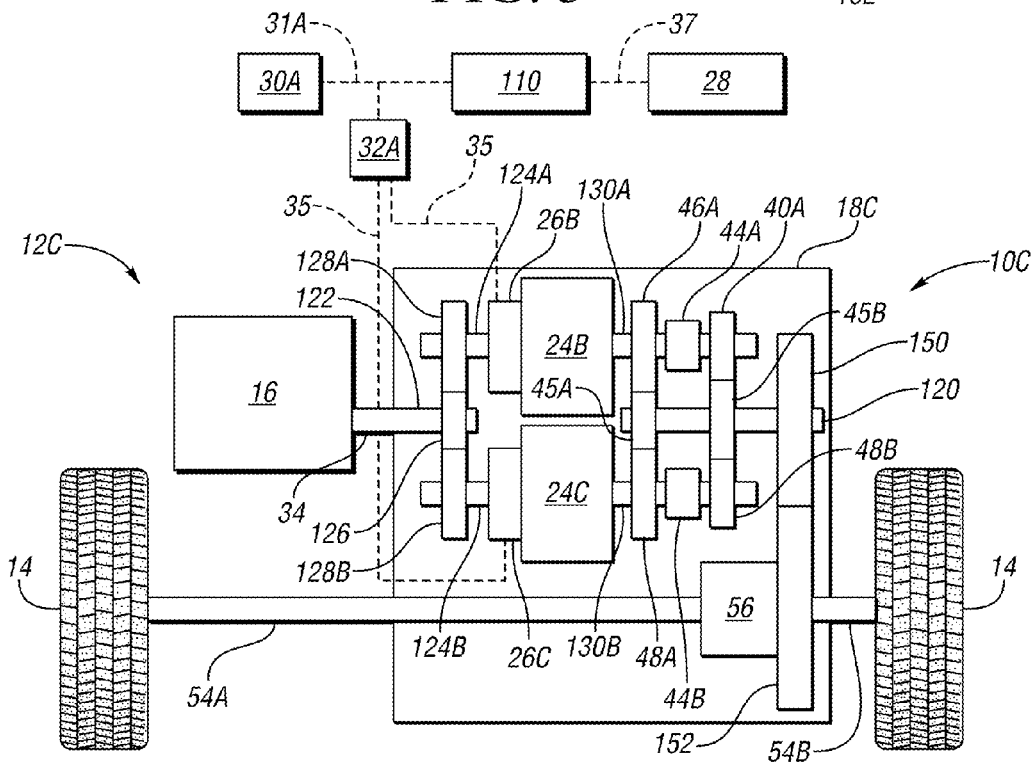
FIG. 4 is a schematic illustration of a vehicle with a powertrain having multiple clutches with multiple clutch actuators in a fourth aspect of the present teachings.

FIG. 4 shows another embodiment of a vehicle 10C with a powertrain 12C. The vehicle 10C and powertrain 12C have many of the same components as vehicle 10B and powertrain 12B of FIG. 3. Like components are labeled with like reference numbers and function as described with respect to FIG. 3. The powertrain 12C is different from powertrain 12B in that the motor-generators of the clutch actuators 26B, 26C are hybrid motor-generators operable to function as a motor using electrical power from the battery 30A at a first voltage to provide torque to the powertrain 12C, or as a generator providing electrical power at the first voltage to the battery 30A along wires 35. The hybrid powertrain 12C has a controller 32A and converter 110 that are configured as described with respect to FIG. 2. With the converter 110, hybrid motor-generators of the clutch actuators 26B, 26C can be used to provide electrical power to the vehicle electrical accessories 28.

The powertrains 12 and 12A of FIGS. 1 and 2 are arranged so that the rotor of the clutch actuator 26 rotates with the engine crankshaft 34. The powertrain 12B of FIG. 3 is arranged so that the rotor of the clutch actuators 26B, 26C rotate with intermediate rotatable members in the transmission 18B (i.e., with first and second transfer shafts 124A, 124B, respectively). In the powertrain 12C of FIG. 4, the transmission 18C is arranged so that the rotor of each of the clutch actuators 26B, 26C is operatively coupled to rotate with the transmission output member 20 so that it is continuously coupled to the vehicle wheels 14 (as the mechanical power input member).

More specifically, FIG. 4 shows the clutch actuators 26B, 26C positioned on the opposite side of the clutches 24B, 24C than in FIG. 3. In this arrangement, each of the rotors 70 (shown in FIG. 5) will be connected to rotate with (and be controllable to rotate relative to) one of the layshafts 130A, 130B. Each clutch 26B, 26C is thus engageable to connect one of the layshafts 130A, 130B for rotation with the first transfer shaft 124A or the second transfer shaft 124B, respectively. In other words, the layshafts 130A, 130B are in the position of the crankshaft in FIGS. 5 and 6, and the transfer shafts 124A, 124B are in the position of the input member 22 in FIGS. 5 and 6. This allows the clutch actuators 26B, 26C to be used not only for controlling engagement of the clutches 24B, 24C, but for some hybrid function. For example, if one or both clutches 24B, 24C are configured like clutch 24A of FIG. 6 so that the clutch 24B or 24C is open when functioning as a generator, then the clutch 24B and/or 24C can perform regenerative braking by converting rotational torque of the layshaft 130A or 130B into electrical energy in a regenerative braking operating mode. This can occur with the engine crankshaft 24 stopped, and the clutch plate 70 stationary. If one of the clutches 24B, 24C is configured in this manner, and the other clutch 24B or 24C is configured to be closed when functioning as a generator, and open when functioning as a motor, then the other clutch 24B or 24C could be controlled to function as a motor when the engine crankshaft is stationary to provide tractive torque to propel the vehicle in an electric-only operating mode.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle powertrain comprising:
a first rotatable member;
a second rotatable member;
a clutch having an engaged state in which torque is transferred between the first rotatable member and the second rotatable member through the clutch; wherein the clutch has a disengaged state in which torque is not transferred between the first rotatable member and the second rotatable member through the clutch;
a clutch actuator that includes:
a motor-generator having a rotor rotatably drivable by one of the first rotatable member and the second rotatable member, and having a stator powerable to rotatably drive the rotor relative to said one of the first rotatable member and the second rotatable member;
a controller operatively connected to the stator and configured to control the motor-generator to function as a generator to provide torque on the rotor to change the state of the clutch from one of the engaged state and the disengaged state to the other of the engaged state and the disengaged state; and
at least one vehicle component operatively connected to the stator; wherein the motor-generator provides electrical power to said at least one vehicle component when the motor-generator functions as a generator.

2. The vehicle powertrain of claim 1, wherein the rotor is rotatably drivable by the first rotatable member, and further comprising:
an engine; wherein the first rotatable member is a crankshaft of the engine; and
wherein the controller is configured to control the motor-generator to provide torque on the rotor to rotate the engine crankshaft.

3. The vehicle powertrain of claim 1, wherein said at least one vehicle component is at least one vehicle electrical accessory, and further comprising:
a battery;
an engine;
a transmission operatively connected to the engine;
at least one hybrid motor-generator operable to function as a motor using electrical power from the battery at a first voltage to provide torque to the powertrain, and operable as a generator to convert torque from the powertrain to electrical power at the first voltage stored in the battery; wherein said at least one vehicle electrical accessory is powerable by electrical power at a second voltage;
a converter operatively connected to the controller, the battery and to said at least one vehicle electrical accessory and configured to convert electrical power from the first voltage to the second voltage; wherein the controller controls the converter to be off when the motor-generator of the actuator provides electrical power to said at least one vehicle accessory sufficient to meet a power demand of said at least one vehicle electrical accessory, and to be on when the motor-generator of the actuator provides less electrical power than required by the power demand of said at least one vehicle electrical accessory.

4. The vehicle powertrain of claim 1, wherein the rotor is rotatably drivable by the first rotatable member, and further comprising:
an engine; wherein the first rotatable member is a crankshaft of the engine;

a transmission having a transmission input member continuously operatively connected to the second rotatable member, and having a transmission output member.

5. The vehicle powertrain of claim 1, wherein said at least one vehicle component is at least one vehicle electrical accessory, wherein the clutch is a first clutch, the clutch actuator is a first clutch actuator, and the motor-generator is a first motor-generator; wherein the rotor is rotatably drivable by the first rotatable member, and further comprising:
an engine having a crankshaft;
a transmission having an input member, an output member, a gearing arrangement, and multiple torque transfer devices selectively engageable to provide torque from the input member to the output member through the gearing arrangement at different torque ratios; wherein the transmission includes a third rotatable member and a fourth rotatable member; wherein said multiple torque transfer devices include said first clutch and a second clutch; wherein the second clutch has an engaged state in which torque is transferred between the third rotatable member and the fourth rotatable member through the second clutch; wherein the second clutch has a disengaged state in which torque is not transferred between the third rotatable member and the fourth rotatable member through the second clutch;
a second clutch actuator that includes:
a second motor-generator having a rotor rotatably drivable by one of the third rotatable member and the fourth rotatable member, and having a stator powerable to rotatably drive the rotor of the second motor-generator relative to said one of the third rotatable member and the fourth rotatable member;
wherein the controller is operatively connected to the stator of the second motor-generator and is configured to control the second motor-generator to provide torque on the rotor of said second motor-generator to change the state of the second clutch from one of the engaged state and the disengaged state to the other of the engaged state and the disengaged state; and
wherein said at least one vehicle electrical accessory is operatively connected to the stator of the second motor-generator, and the second motor-generator provides electrical power for said at least one vehicle electrical accessory when the second motor-generator functions as a generator.

6. The vehicle powertrain of claim 5, wherein the first motor-generator and the second motor-generator are hybrid motor-generators providing electrical power at a first voltage; wherein the vehicle electrical accessory requires electrical power at a second voltage;
wherein said one of the first rotatable member and the second rotatable member and said one of the third rotatable member and the fourth rotatable member are continuously operatively connected with the transmission output member;
wherein the first and second clutches are configured so that the first and second motor-generators can be controlled to provide a regenerative braking operating mode and an electric-only operating mode with the engine crankshaft stationary.

7. The vehicle powertrain of claim 1, wherein the motor-generator is the only motor-generator included in the vehicle powertrain.

8. The vehicle powertrain of claim 1, wherein the transmission is one of a dual-input clutch transmission, a manual transmission and an automated manual transmission.

9. The vehicle powertrain of claim 1, wherein said at least one vehicle component is at least one vehicle electrical accessory, and further comprising:
a battery operatively connected to said at least one vehicle electrical accessory and to the motor-generator;
wherein the controller is configured to direct at least some of the electrical power provided by the motor-generator to the battery if said at least some of the electrical power is not required by said at least one vehicle electrical accessory and if a state-of-charge of the battery is less than a predetermined maximum state-of-charge.

10. The vehicle powertrain of claim 1, wherein the clutch includes a rotatable clutch housing fixed to rotate with one of the first rotatable member and the second rotatable member;
wherein the clutch actuator includes a hollow drive screw extending into said clutch housing; wherein the rotor is fixed to the drive screw; wherein the other one of the first rotatable member and the second rotatable member extends through the hollow drive screw into the clutch housing;
wherein the clutch further includes:
a pressure plate splined to the clutch housing and supported on the drive screw;
a clutch plate splined to the other one of the first rotatable member and the second rotatable member within the clutch housing and configured to rotate with said other one of the first rotatable member and the second rotatable member; wherein the clutch plate supports friction material sufficient to engage the clutch housing when the clutch is in the engaged state so that the first rotatable member and the second rotatable member rotate together when the clutch is in the engaged state; and
wherein rotation of the drive screw relative to the clutch housing when the motor-generator functions as a generator moves the pressure plate axially to thereby change the state of the clutch from one of the engaged state and the disengaged state to the other of the engaged state and the disengaged state.

11. A vehicle powertrain for providing tractive torque to vehicle wheels, the powertrain comprising:
an engine having an engine crankshaft;
a transmission having a transmission input member and a transmission output member, the transmission being configured to provide driving torque from the transmission input member to the transmission output member at different torque ratios; wherein the transmission output member is configured to be continuously operatively connectable to the vehicle wheels;
a clutch having an engaged state in which torque is transferred between the engine crankshaft and the transmission input member through the clutch; wherein the clutch has a disengaged state in which torque is not transferred between the first rotatable member and the second rotatable member through the clutch;
a clutch actuator that includes:
a motor-generator having a rotor rotatably drivable by the engine crankshaft, and having a stator powerable to rotatably drive the rotor relative to the engine crankshaft;
a controller operatively connected to the stator and configured to control the motor-generator to function as a generator to thereby provide torque on the rotor to change the state of the clutch from one of the engaged state and the disengaged state to the other of the engaged state and the disengaged state;

at least one vehicle electrical accessory operatively connected to the stator; and wherein the motor-generator provides electrical power to said at least one vehicle electrical accessory when the motor-generator functions as a generator.

12. The vehicle powertrain of claim 11, wherein the clutch includes at least one biasing member biasing the clutch to the disengaged state; and wherein the motor-generator overcomes the bias of the at least one biasing member when the motor-generator functions as a generator, the motor-generator thereby providing torque on the rotor so that the rotor rotates in a forward direction of rotation relative to the engine crankshaft to engage the clutch.

13. The vehicle powertrain of claim 11, wherein the motor-generator functions as a generator to provide electrical power to said at least one vehicle electrical accessory when the engine crankshaft is rotating.

14. The vehicle powertrain of claim 11, wherein the transmission includes at least one selectively engageable torque transfer device between the transmission input member and the transmission output member; and
wherein the transmission is operable in a neutral state in which said at least one selectively engageable torque transfer device is not engaged and in which the motor-generator is operable as a generator to supply electrical power to said at least one vehicle electrical accessory with the clutch in the engaged state.

15. The vehicle powertrain of claim 11, wherein the clutch includes at least one biasing member biasing the clutch to the disengaged state; wherein the motor-generator is controllable to function as a motor to rotate the engine crankshaft to start the engine with the clutch in the disengaged state due to one of said at least one biasing member and torque of the motor-generator functioning as a motor.

16. The vehicle powertrain of claim 15, wherein the motor-generator is the only motor-generator included in the vehicle powertrain that is configured to start the engine and to provide electrical power to said at least one vehicle electrical accessory.

17. The vehicle powertrain of claim 11, wherein the clutch includes a rotatable clutch housing fixed to rotate with the engine crankshaft;
wherein the clutch actuator includes a hollow drive screw extending into said clutch housing; wherein the rotor is fixed to the drive screw; wherein the transmission input member extends through the hollow drive screw into the clutch housing;
wherein the clutch further includes:
a pressure plate splined to the clutch housing and supported on the drive screw;
at least one biasing member biasing the pressure plate to an axial position relative to the clutch housing;
a clutch plate splined to the transmission input member within the clutch housing and configured to rotate with the transmission input member; wherein the clutch plate supports friction material sufficient to engage the clutch housing when the clutch is in the engaged state so that the engine crankshaft and the transmission input member rotate together when the clutch is in the engaged state; and
wherein rotation of the drive screw relative to the clutch housing when the motor-generator functions as a generator moves the pressure plate axially to overcome the bias of the biasing member and thereby change the state of the clutch from the disengaged state to the engaged state.

18. A vehicle powertrain comprising:
a transmission having:
a first rotatable member configured to receive mechanical power input;
a second rotatable member;
a clutch having an engaged state in which torque is transferred between the first rotatable member and the second rotatable member through the clutch; wherein the clutch has a disengaged state in which torque is not transferred between the first rotatable member and the second rotatable member through the clutch;
a clutch actuator that includes:
a motor-generator having a rotor rotatably drivable by the first rotatable member, and having a stator powerable to rotatably drive the rotor relative to the first rotatable member;
a controller operatively connected to the stator and configured to control the motor-generator to function as a generator to provide drag torque on the rotor sufficient to change the state of the clutch from one of the engaged state and the disengaged state to the other of the engaged state and the disengaged state, thereby converting a portion of the mechanical power input to electrical power; and
at least one vehicle electrical accessory operatively connected to the stator and powered by the electrical power provided by the motor-generator.

19. The vehicle powertrain of claim 18, wherein the controller is configured to determine a power demand of the vehicle electrical accessories; and
wherein the controller controls the stator to provide an amount of drag torque correlated with the power demand of the vehicle electrical accessories and between a minimum amount required to transmit a desired mechanical power through the clutch and a maximum amount corresponding with an electrical generating capacity of the motor-generator.

20. The vehicle powertrain of claim 18, wherein the clutch is a first clutch, the clutch actuator is a first clutch actuator, and the motor-generator is a first motor-generator; and further comprising:
at least one additional rotatable member;
at least one additional clutch connected between a different pair of the rotatable members in the transmission than the first clutch;
at least one additional clutch actuator configured to actuate said at least one additional clutch; wherein said at least one additional clutch actuator is substantially identical to the first clutch actuator and has a second hybrid motor-generator;
a power converter operatively connected to said at least one vehicle electrical accessory and the hybrid motor-generators;
wherein the transmission is configured such that at least one of the first clutch actuator and said at least one additional clutch actuator is actuated during at least two different operating modes of the transmission; and
wherein the motor-generators are controllable to provide at least one of a regenerative braking operating mode and an electric-only operating mode.

* * * * *